United States Patent [19]

Kanemaru et al.

[11] Patent Number: 5,498,360

[45] Date of Patent: Mar. 12, 1996

[54] PROCESS FOR RECYCLING USED-UP DRY CELLS, AND FERRITE PRODUCTION PROCESS

[75] Inventors: Takashi Kanemaru, Chiba; Takaaki Iwasaki, Hokkaido; Toshio Saito; Shigeaki Suda, both of Akita; Takeo Kitagawa, Chiba, all of Japan

[73] Assignees: Nomura Kohsan Co., Ltd.; TDK Corporation, both of Tokyo, Japan

[21] Appl. No.: 269,212

[22] Filed: Jun. 30, 1994

[30] Foreign Application Priority Data

Jun. 30, 1993 [JP] Japan .................................. 5-187294
Jun. 30, 1993 [JP] Japan .................................. 5-187295

[51] Int. Cl.$^6$ ........................................................ B09B 5/00
[52] U.S. Cl. .......................... 252/62.56; 252/62.62; 423/594; 423/49; 423/99; 241/24; 241/23; 241/29; 241/20; 241/25; 241/DIG. 38
[58] Field of Search .................................. 241/24, 23, 29, 241/20, 25, DIG. 38; 423/594, 49, 99; 252/62.62, 62.56

[56] References Cited

U.S. PATENT DOCUMENTS 4,775,107  10/1988  Heng et al. .
5,279,743   1/1994  Ward et al. ............................ 423/49

FOREIGN PATENT DOCUMENTS

| 0247023 | 11/1987 | European Pat. Off. . |
| 50-1094 | 1/1975 | Japan . |
| 52-7813 | 3/1977 | Japan . |
| 60-136174 | 7/1985 | Japan . |
| 60-156594 | 8/1985 | Japan . |
| 60-211023 | 10/1985 | Japan . |
| 61-11191 | 1/1986 | Japan . |
| 61-488 | 1/1986 | Japan . |
| 61-78484 | 4/1986 | Japan . |
| 61-97085 | 5/1986 | Japan . |
| 61-118182 | 6/1986 | Japan . |
| 61-234981 | 10/1986 | Japan . |
| 62-145658 | 6/1987 | Japan . |
| 62-286584 | 12/1987 | Japan . |
| 63-2676 | 1/1988 | Japan . |
| 63-25830 | 5/1988 | Japan . |
| 2-47059 | 10/1990 | Japan . |
| 3-6208 | 1/1991 | Japan . |
| 3-31116 | 5/1991 | Japan . |
| 3-48624 | 7/1991 | Japan . |
| 4-65063 | 3/1992 | Japan . |
| 4-22975 | 4/1992 | Japan . |
| 676169 | 12/1990 | Switzerland . |
| 681401 | 3/1993 | Switzerland . |

OTHER PUBLICATIONS

Database WPI, Derwent Publications Ltd., AN 79-88454B & JP-A-54 138 885, Oct. 27, 1979.

Primary Examiner—C. Melissa Bonner
Attorney, Agent, or Firm—Oblon, Spivak, McClelland, Maier, & Neustadt

[57] ABSTRACT

Manganese dry cells sorted out of used-up dry cells are crushed and sieved to obtain a mixture composed predominantly of anodic substances, which is in turn used for ferrite production. The invention is preferable for a saving of resources and preservation of the environment, and enables ferrites on a practical-enough level to be obtained.

14 Claims, 2 Drawing Sheets

PROCESS FOR RECYCLING USED-UP DRY CELLS, AND FERRITE PRODUCTION PROCESS

BACKGROUND OF THE INVENTION

1. Technical Field

This invention relates to a process for recycling used-up dry cells, especially manganese dry cells, and a process for producing soft ferrite by making use of such used-up dry cells.

2. Background Art

With recent reductions in the size and weight of electrical appliances and a current wide distribution of portable types, there is an increase in the quantitative proportion of dry cells used. Most of dry cells used as primary cells are of manganese and alkali-manganese types, and are now often discarded with domestic waste after use. In some cases, these used-up dry cells are incinerated as by municipal corporations together with domestic waste. Alternatively, they are collected in the form of garbage, and thereafter disposed by collectors, etc.

For the disposal of the thus collected used-up dry cells, various proposals have been made from the recent viewpoint of preservation of the environment, a saving of resources and reductions in the volume of waste. For instance, there are processes for classifying or dismantling them or processes for separating valuable materials from them, as set forth in JP-A 60-136174, JP-A 61-488, JP-A-61-78484, JP-A 61-97085, JP-A 61- 18182, JP-A 61-23498, JP-A 62-145658, JP-A 62-286584, JP-A 4- 65063, JP-B 4-22975, JP-B 3-31116, JP-B 63-2676, JP-B 3-6208, JP-B 3-48624, JP-B 2-47059, JP-B 63-25830, JP-B 52-7813, JP-A 50-1094, JP-A 61-11191, JP-A 60-156594, JP-A 60-211023, etc.

However, although all these publications suggest that the material obtained from used-up dry cells like manganese dry cells may be recycled as the raw material for preparing magnetic materials such as manganese dioxide or ferrites, they make no illustrative reference to the obtaining of materials such as ferrites. This is because the prior process cost much due to consumption of much energy; that is, their low cost-effectiveness hinders the progress of recycling and collecting techniques. Thus, current rates of recovering and recycling used-up dry cells remains still very low.

Under such situations, it is expected that if material of high value added can be obtained from used-up dry cells, the rate of recovering them will then increase spontaneously. This is also preferable in view of preservation of the environment, a saving of resources, and reductions in the volume of waste. Thus, there is a strong demand for the effective recycling of used-up dry cells.

DISCLOSURE OF THE INVENTION

A primary object of the invention is to achieve a saving of resources and preservation of the environment by recycling used-up dry cells. More specifically, the invention has for its object the provision of a process for preparing practical-enough ferrites, especially soft ferrite, and a process for recycling used-up dry cells to this end.

Such objects are achieved by the following constructions (1) through (16).

(1) A process for recycling used-up dry cells by sorting manganese dry cells out of said used-up dry cells, crushing the thus sorted manganese dry cells, sieving the thus crushed manganese dry cells to obtain a mixture that is composed predominantly of anodic substances, washing said mixture with water, and calcining the thus washed mixture to obtain manganese and zinc oxides.

(2) A process for recycling used-up dry cells according to the above (1), wherein said sieving is carried out with a sieve having an opening of 1 to 4 mm.

(3) A process for recycling used-up dry cells according to the above (1), wherein said calcination is carried out at a temperature of 700° to 950° C.

(4) A process for recycling used-up dry cells according to the above (1), wherein said calcination is carried out for 1 to 5 hours.

(5) A process for recycling used-up dry cells according to the above (1), wherein said water washing is carried out with water that, on weight basis, is 2 to 10 times as much as the material to be washed.

(6) A process for recycling used-up dry cells according to the above (1), wherein said manganese dry cells sorted out of said used-up dry cells are further sorted out according to ultra-high-power and high-power grades, and then crushed for each grade.

(7) A process for recycling used-up dry cells according to the above (1), wherein a mixture that is predominantly made up of metal sheaths, cathodic substances and collecting rods is obtained by said sieving, and is then magnetically sorted into iron, lead and carbon components.

(8) A process for preparing ferrite by sorting manganese dry cells out of said used-up dry cells, crushing the thus sorted manganese dry cells, sieving the thus crushed manganese dry cells to obtain a mixture that is composed predominantly of anodic substances, washing said mixture with water, calcining the thus washed mixture to obtain manganese and zinc oxides, and preparing said ferrite using said manganese and zinc oxides.

(9) A process for preparing ferrite according to the above (8), wherein said water washing is carried out with ion exchanged water, whereby at least one impurity of sodium or potassium compounds, calcium oxide, magnesium oxide and chlorine compounds is removed.

(10) A process for preparing ferrite according to the above (8), wherein a raw powdery mixture comprising said manganese and zinc oxides is fired to obtain said ferrite.

(11) A process for preparing ferrite according to the above (8), wherein said calcination is carried out in an oxidizing atmosphere for carbon removal, and said raw powdery mixture is fired.

(12). A process for preparing ferrite according to the above (8), wherein said manganese and zinc oxides are used as the raw material to obtain a chloride solution, the thus obtained chloride solution is roasted in a spray roasting furnace to obtain metal oxide particles, the thus obtained metal oxide particles are used to obtain a raw powdery mixture, and the thus obtained raw powdery mixture is fired.

(13) A process for preparing ferrite according to the above (12), wherein a mixture that is predominantly made up of metal sheaths, cathodic substances and collecting rods is obtained by said sieving, followed by magnetic sorting for obtaining an iron component, and the thus obtained iron component is used as the raw material to obtain said chloride solution.

(14) A process for preparing ferrite according to the above (12), wherein a mixture that is predominantly made up of metal sheaths, cathodic substances and collecting rods is obtained by said sieving, followed by magnetic sorting for obtaining an zinc component, and the thus obtained zinc component is used as the raw material to obtain said chloride solution.

(15) A process for preparing ferrite according to the above (12), wherein said roasting is carried out in a spray roasting furnace after any silicon component has been separated and removed from said chloride solution.

(16) A process for preparing ferrite according to the above (12), wherein said roasting is carried out in a spray roasting furnace after any carbon component has been separated and removed from said chloride solution.

ILLUSTRATIVE CONSTRUCTIONS

Figure 1A:
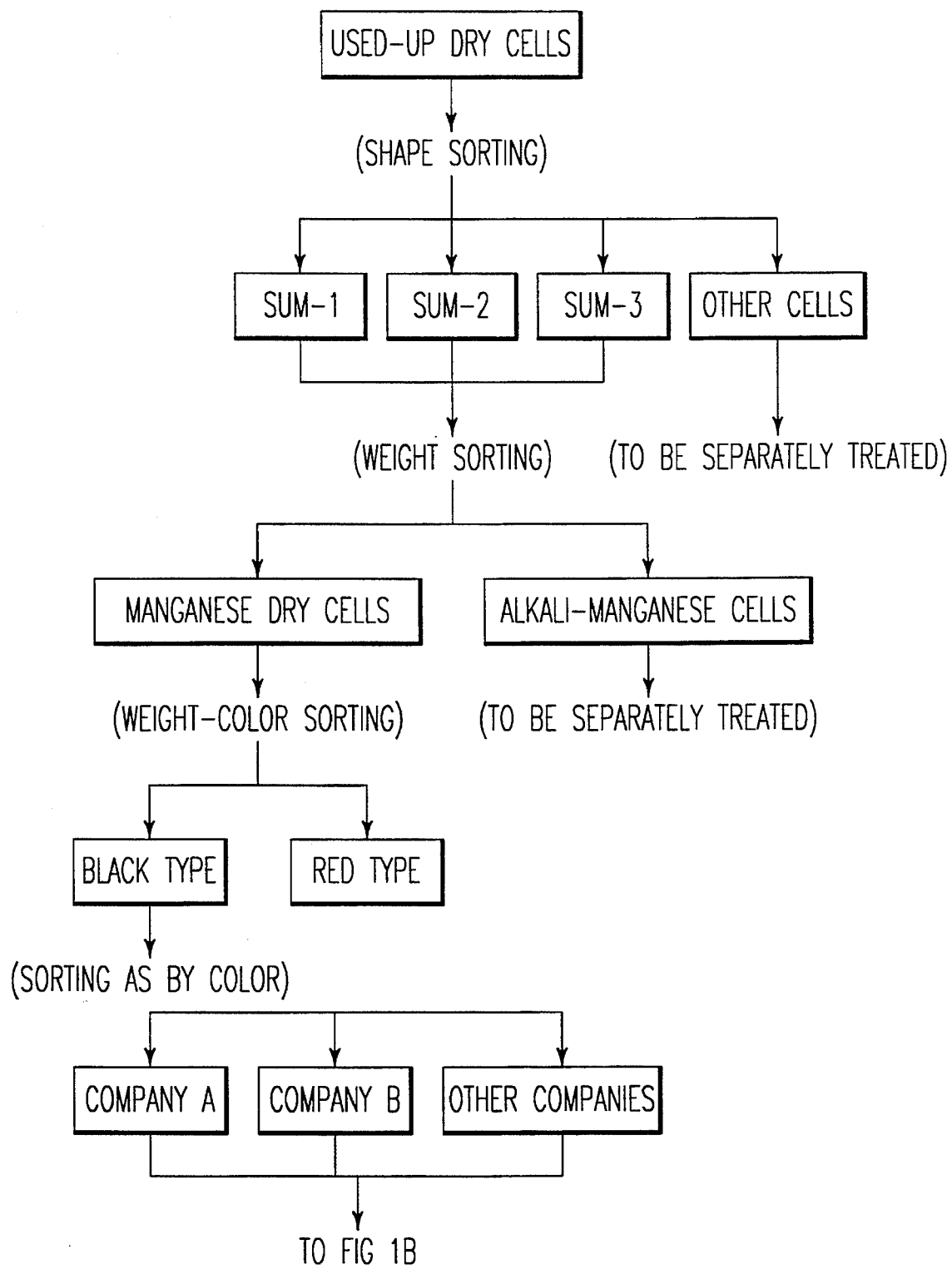
FIG. 1 is a flowchart showing the process of recycling used-up dry cells.

Illustrative constructions of the present invention will now be explained at great length.

In the invention, at least a part of the raw oxides used for the preparation of ferrites, especially soft ferrite (which may hereinafter be simply called ferrite) is derived from the constitutional components of used-up dry cells. In this case, the used-up dry cells are understood to be manganese dry cells.

The process of recycling used-up dry cells primarily comprises the steps of:

(1) sorting only manganese dry cells out of many kinds of used-up dry cells and crushing the thus sorted manganese dry cells, (2) sieving the thus crushed product to obtain a mixture that is composed predominantly of anodic substances (hereinafter called the combined substance), (3) washing the mixture composed predominantly of the combined substance, and (4) calcining the thus washed product.

This makes it possible to obtain manganese-zinc compounds suitable for the raw material for soft ferrite by making use of manganese dry cells sorted out of many kinds of used-up dry cells. That is, a mixture of manganese and zinc oxides is obtained from the combined substance according to the invention. This mixture may immediately be used for the production of soft ferrite or other purposes. In this case, some components harmful to the ferrite can be removed by water washing and calcination.

There may also be provided an additional step of magnetically separating another material including metal sheaths and zinc containers other than the mixture obtained by the above sieving and composed predominantly of the combined substance into iron and zinc components, thereby obtaining iron and zinc materials. The thus obtained iron and zinc materials may optionally be used for soft ferrite production. In addition, they may have some application in the form of iron and zinc sources. Carbon, on the other hand, may be used in the form of snow-melting agents, reducing agents, fuel, etc.

The soft ferrite obtained according to the present invention may have any desired composition on condition that they are made up of Mn and/or Zn, and so may be exemplified by Mn-Zn ferrite, Ni-Mn-Zn ferrite, Ni-Cu-Zn ferrite, and Mn-Mg ferrite. The present invention is best suited for the production of Mn-Zn ferrite in particular. All components capable of providing the raw oxides for Mn-Zn ferrite are contained in manganese dry cells; it is possible to make effective use of used-up dry cells.

Ferrite production may be achieved either by dry techniques or by spray roasting techniques. Especially when reliance is placed on dry techniques, it is preferable to use the manganese-zinc compounds coming from the combined substance obtained as mentioned above. In the combined substance the manganese and zinc components exist homogeneously, and so the mixture obtained therefrom according to the invention contains both the components homogeneously. For this reason, it is unnecessary to isolate the mixture into individual components. If this mixture is used for ferrite production, it is then possible to omit the step of mixing the manganese and zinc components together; ferrite production can be facilitated due to a simplification of the subsequent mixing step.

When ferrite production relies upon spray roasting, on the other hand, it is preferable to use the mixture composed predominantly of the combined substance in combination with the iron and zinc materials obtained as mentioned above. It is of vital importance for spray roasting to prepare a chloride solution, and refinement is feasible after the preparation of the chloride solution. In other words, the spray roasting techniques are more unlikely to depend on material than the dry techniques. Hence, it is possible to reuse manganese dry cells more effectively.

In the present invention, it is preferable to provide an additional step of separating the manganese dry cells sorted out of many kinds of used-up dry cells according to grades "PU" for ultra-high-power manganese dry cells and "P" for high-power manganese dry cells. For instance, it is preferable to sort out only ultra-high-power manganese dry cells "PU" for soft ferrite production.

A preferable example of the process for recycling used-up dry cells according to the present invention will now be explained, by way of example but not by way of limitation, with reference to the accompanying flowchart or FIG. 1.

(1) Sorting Step

The end manganese dry cells are sorted out of many kinds of used-up dry cells according to the grades "PU" for ultra-high-power manganese dry cells and "P" for high-power manganese dry cells. A collection of used-up dry cells includes varying kinds of dry cells such as alkali-manganese, lithium, mercury and nickel-cadmium dry cells in addition to manganese dry cells. Out of these, the most effectively reusable manganese dry cells are sorted for soft ferrite production.

Then, the manganese dry cells are sorted into ultra-high-power manganese dry cells "PU" that will hereinafter be referred to as the black type" and high-power manganese dry cells "P" that will hereinafter be called the red type by means of suitable sorting techniques such as shape, weight, and color sorting methods, which may be used in combination with one another. The black and red types may be further be sorted out for each maker. The grades "PU" and "P" will be described later in more detail.

Figure 1B:
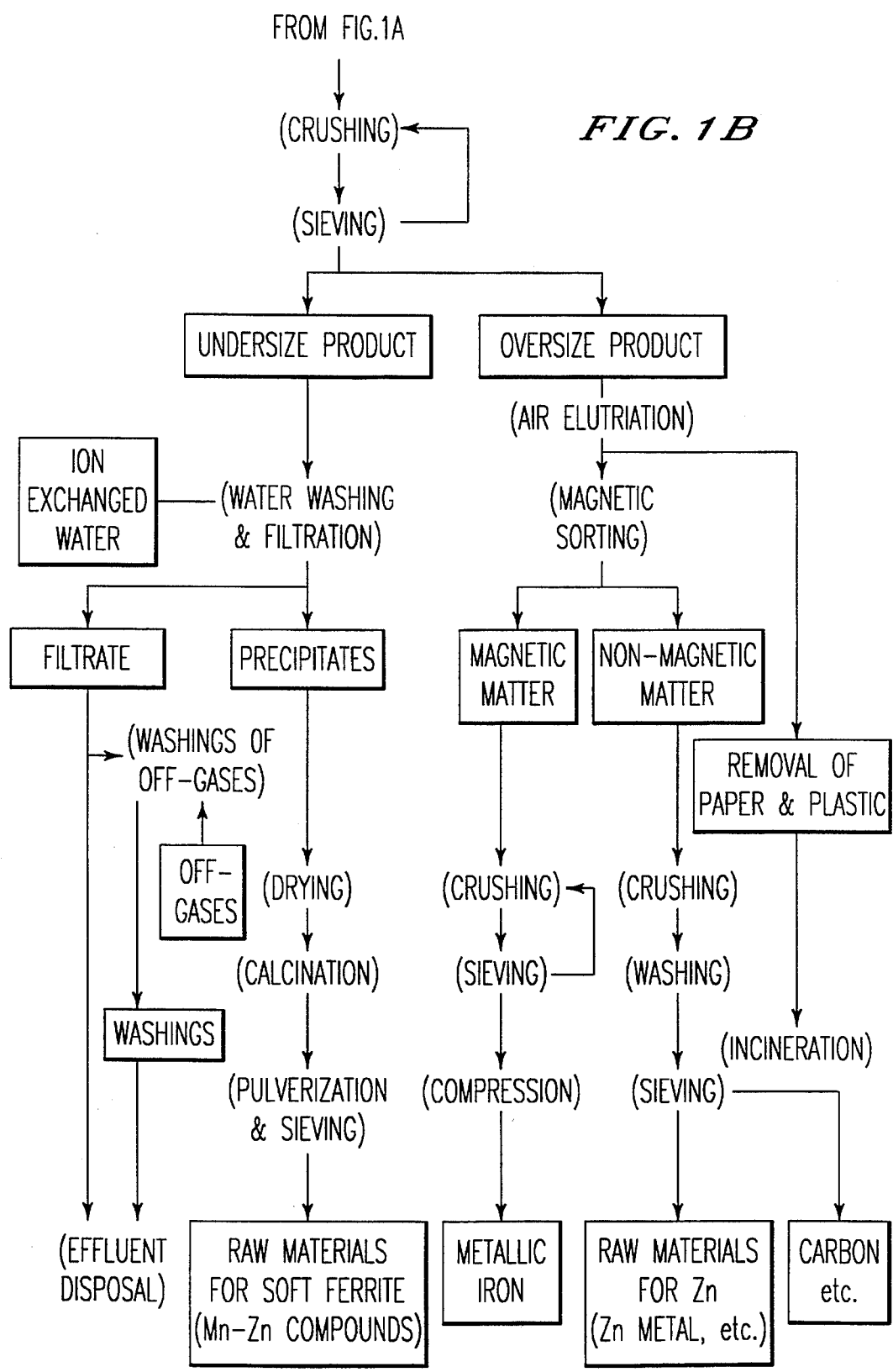

More specifically, the used-up dry cells are sorted by shape to separate cylindrical forms of SUM-1, SUM-2 and SUM-3 cells—which occupy a large part of manganese dry cells—from other forms of cells, as shown in FIG. 1. For this sorting use may be made of a shape sorter, so that a collection of used-up dry cells can be continuously sorted out.

Currently available dry cells are classified, as tabulated below.

| JIS (old) | JIS (new) Mn | IEC Alkali-Mn | Mn | ANSI Alkali-Mn |
| --- | --- | --- | --- | --- |
| SUM-1 | R20P | LR20P | 13C | 13A |
| SUM-2 | R14P | LR14P | 14C | 14A |
| SUM-3 | R6P | LP6P | 15C | 15A |

The cylindrical forms of R20P (LR20P or 13C and 13A), R14P (LR14P or 14C and 14A) and R6P (LP6P or 15C and 15A) dry cells sorted out by shape include alkali-manganese cells in addition to manganese dry cells. Then, the manganese dry cells are sorted out of the alkali-manganese dry cells on weight basis. An alkali-manganese dry cell is generally heavier than a manganese dry cell, and this is true of even when both are of the same shape and weight. For this weight sorting use may be made of a weight sorter, so that a collection of dry cells can be continuously sorted out.

The thus sorted-out manganese dry cells are then separated into the black and red types by color sorting. Black and red predominate in the black and red types, respectively. For this color sorting use may be made of a color sorter, so that a collection of dry cells can be continuously sorted out. In this case, this color sorting may be used in combination with weight sorting. Moreover, the black and red types may be sorted out for each maker by color sorting or by the name of each maker such as its trade mark.

In this case, the manganese dry cells may be sorted into the black and red type, followed by sorting for each maker, and vice versa. Alternatively, the manganese dry cells may be sorted into the black and red types or for each maker by means of bar codes printed on them.

After sorting-out, the manganese dry cells are treated for each group or set of cells, so that the quality of the final group of cells used for recycling can be kept constant. In the present invention, it is preferable to recycle the black type for ferrite production. A typical example of recycling the black type will now be explained with reference to FIG. 1.

(2) Crushing Step

The objective of this crushing step is to separate the mixture composed predominantly of the combined substance from other portion. For instance, the mixture composed predominantly of the combined substance is crushed to a given size of up to 2 mm, while the other portion is crushed to a given size exceeding 2 mm. For the crusher use may be made of a screened type of swing hammer crusher. In particular, it is desired to control the peripheral speed of the crusher so as to prevent over-crushing of carbon rods, paper, etc., to 2 mm or less. Moreover, an oversize product exceeding 2 mm may be crushed and separated several times, or a part of crushing may be done wet.

In most cases, it is preferable to allow the crusher used for this crushing step to take a form that makes separation at the subsequent sieving step. This assures the separation of the mixture composed predominantly of the combined substance by repeating the crushing and sieving of the oversize product.

(3) Sieving Step

Crushed products of various sizes obtained by the above crushing step are sieved into an undersize product that is composed predominantly of the combined substance, i.e., manganese and zinc oxides and is of a given size of up to 2 mm for instance, and an oversize product that is predominantly made up of metallic iron, zinc containers, carbon rods, paper and plastics and is of a given size exceeding 2 mm for instance. For this sieving use may be made of a suitable machine such as a vibrating or trommel screen. In most cases, this sieving machine should preferably take a form that allows it to be in operative association with the crusher, as already mentioned. The sieve of the sieving machine has an opening predetermined depending upon the size of particles obtained by the crushing of the mixture composed predominantly of the combined substance, and may usually have an opening of about 1 to 4 mm, preferably about 2 mm.

The oversize product may be crushed and sieved once more or twice, whereby about 75 to 80% by weight of the mixture composed predominantly of the combined substance is separated from the crushed manganese dry cells in the form of an undersize product. The oversize and undersize products are then treated for each size. Here the treatment of the undersize product will now be explained.

(4) Water Washing Step

It is preferable that the undersize product is refined by water washing prior to calcination, thereby removing impurities from the combined substance, for instance, sodium and potassium compounds, calcium oxide, magnesium oxide, and chlorine compounds. These impurities should preferably be removed as much as possible, because they have an adverse influence on making the raw material for soft ferrite production. To this end it is preferable to use water containing less harmful components, more specifically ion exchanged water. In view of achieving sufficient washing and a saving of water resources, it is then desired that the amount of the washing water used be about 2 to 10 times, preferably about 4 times, that of the product to be washed, on weight basis.

For water washing, predetermined amounts of water and the undersize product may be agitated or continuously filtered under agitation in a suitable vessel. It is preferable that the solid matter obtained by filtration is further washed with fresh ion exchanged water. The total amount of washing water may lie in the range mentioned above. It is understood that the solid matter obtained by filtration may be dried by means of various dryers.

By use of such water washing it is possible to remove 63 to 70% by weight of $Na_2O$, 70 to 75% by weight of $K_2O$, 56 to 60% by weight of MgO, 65 to 73% by weight of CaO and 50 to 65% by weight of chlorine compounds (calculated as Cl), all being present as impurities.

The water washing step mentioned above should preferably be used for ferrite production, regardless of whether it relies upon dry techniques or spray roasting techniques. In particular, the water washing is best suited for dry ferrite production.

(5) Calcination Step

The solid matter obtained through the crushing and sieving steps and optionally the water washing step and composed predominantly of manganese-zinc compounds coming from the combined substance is then calcined in a calcination furnace usually at an internal temperature of about 700° to 950° C. for about 1 to 5 hours.

For instance, such calcination enables manganese compounds to be converted into various lower to higher manganese oxides, and zinc compounds to be converted into zinc oxides. It is also possible to volatilize off chlorine residues with removal of carbon residues.

When the manganese-zinc compounds derived from the combined substance are used for dry ferrite production, it is required to remove carbon residues from the combined substance. To this end it is desired that the calcination be carried out as long as possible, e.g., for about 4 to 5 hours. It is also desired that an oxidizing atmosphere prevail in the calcination furnace for removal of carbon residues.

Soft ferrite production may also be achieved by subjecting a solution of the combined substance or the mixture composed predominantly of the combined substance in hydrochloric acid to spray roasting. In this case, no problem arises even when the conversion of manganese and zinc compounds into lower manganese oxides (e.g., manganese monoxide (MnO)) and zinc oxide (ZnO) by calcination has been slightly insufficient. Carbon and other residues, even though they remain upon calcination, can be removed at the steps of dissolving the combined substance or the like in hydrochloric acid and refining impurities. For this reason, the calcination may be carried out for 1 to 2 hours with an reducing atmosphere prevailing in the furnace.

In the present disclosure, it is understood that the "oxidizing atmosphere" refers to one in which higher oxides of manganese are formed, and the "reducing atmosphere" to one in which lower oxides of manganese are produced.

(6) Pulverizing Step

The calcined product is pulverized to or below a given particle size, e.g., 200 meshes, by means of a screened pulverizer or the like.

The pulverizer mentioned above also serves as a sieve. For sieving, however, it is preferable to use a sieve having a predetermined opening. This sieving is effective for a dry type of soft ferrite production. By sieving it is possible to remove iron and carbon impurities coming from machinery.

The pulverized product is a mixture composed primarily of manganese and zinc oxides, and having an Mn content of about 57.4 to 66.0% by weight (calculated as MnO) and a Zn content of about 26.2 to 31.8% by weight (calculated as ZnO). This product also contains impurities such as Cl, C, a silicon component or $SiO_2$, CaO, MgO, P, $Na_2O$, and $K_2O$. In general, the amounts of impurities are of the order of 0.03 to 0.60% by weight for Cl, 0.02 to 4.1% by weight for C, 0.01 to 0.06% by weight for $SiO_2$, 0.015 to 0.06% by weight for CaO, 0.015 to 0.04% by weight for MgO, 0.003 to 0.01% by weight for P, 0.02 to 0.03% by weight for $Na_2O$, and 0.01 to 0.03% by weight for $K_2O$.

The amounts of these impurities in the pulverized product may optionally be varied depending on purpose. For instance, when used for a dry type of soft ferrite production, the pulverized product should contain a reduced amount of impurities, or should be diluted with clean raw material for use. When used for a spray roasting type of soft ferrite production, the pulverized product may contain a slightly large amount of impurities, because they can be removed by refinement after dissolved in hydrochloric acid.

If the amount of impurities is within the range mentioned above, the pulverized product may immediately be used for a dry type of soft ferrite production. It is especially preferable to use a pulverized product containing up to 0.3% by weight of Cl and up to 1% by weight of C.

(7) Effluent Disposal Step

The filtrate coming from the water washing step is recovered together with washings obtained by washing off-gases emitted from the calcination step. Because of containing zinc chloride, the filtrate and washings should preferably be recovered as a zinc source.

More specifically, zinc chloride is recovered either through concentration or in the form of zinc hydroxide by neutralization. It is here noted that the zinc compound in the undersize product is picked up and recovered in an amount of about 4 to 5% by weight (calculated as metal) of the overall cells at the water washing step and in an amount of about 3 to 4% by weight at the calcination step.

The thus recovered zinc compound is particularly preferred for use in a spray roasting type of ferrite production.

A particular objective of the present invention is to produce ferrites using as raw materials manganese-zinc compounds derived from the combined substance of the undersize product obtained at the sieving step (3). While reference has been made to the treatment of the undersize product, it is understood that zinc and iron matters obtained from the oversize product may also be used as raw materials. The treatment of the oversize product will now be explained.

(8) Air Elutriation Step

This step is to use air power to separate paper and plastics from the oversize product obtained by sieving. The thus recovered paper and plastics are to be not recycled; that is, they are incinerated for disposal. It is understood that the air elutriation step is carried out in association with the crushing step. It is preferable that the air elutriation is repeated at the delivery and sieving steps that are optionally applied as when crushing is repeated several times.

(9) Magnetic Sorting Step

Magnetic iron sheaths contained in the oversize product obtained at the sieving step are magnetically sorted out of non-magnetic materials. To this end it is preferable to use a drum type of magnetic sorter, a magnet roller, etc. If required, these iron sheaths are reduced in volume as by crushing, sieving, and compression, so that they can be recovered as metallic iron, if required, by refinement. The thus recovered iron has a purity of the order of 97.5 to 98.8%. To effectively recover the iron sheaths alone, it is preferable that the magnetic sorting is repeated at the stage where the oversize product is repeatedly crushed and sorted out.

The thus recovered metallic iron cannot immediately be used for a dry type of ferrite production, but may be used to obtain an iron oxide that is used as the raw material for ferrite production. On the other hand, the metallic iron can immediately be used for a spray roasting type of ferrite production.

(10) Zinc Recovery Step

This step is provided to recover zinc matter from the non-magnetic matter sorted out at the magnetic sorting step by crushing, water washing, and sieving. The non-magnetic matter is primarily made up of zinc containers and carbon rods, with the combined substance deposited thereon. After the carbon rods are crushed and the combined substance is removed by water washing, the zinc containers are recovered by sieving. Zinc metal of 98.1 to 99.3% purity is then obtained by melting the thus recovered zinc containers by heating. Carbon derived from the carbon rods can also be recovered and recycled.

The thus recovered zinc metal cannot immediately be used for a dry type of ferrite production, but may be used to obtain a zinc oxide that is used as the raw material for ferrite production. On the other hand, the zinc metal can immediately be used for a spray roasting type of ferrite production.

While reference has been made to the black type of manganese dry cells, it is understood that use may also be optionally made of the red type of cells; in other words, they may be treated in similar manners as mentioned above.

The manganese-zinc compounds obtained from the red type of the combined substance has an Mn content of about 53.0 to 61.6% by weight (calculated as MnO) and a Zn content of about 26.7 to 33.1% by weight (calculated as ZnO). The amounts of impurities are of the order of 0.08 to 0.35% by weight for Cl, 0.1 to 5.6% by weight for C, 0.3 to 1.1% by weight for $SiO_2$, 0.04 to 0.13% by weight for CaO, 0.03 to 0.08% by weight for MgO, 0.02 to 0.06% by weight for P, 0.02 to 0.07% by weight for $Na_2O$, and 0.06 to 0.25% by weight for $K_2O$.

As can be appreciated from the foregoing, the red type is larger than the black type in terms of the amount of the silicon component or $SiO_2$, and is not preferable for use as the raw material for a dry type of ferrite production. However, this type can be used for a spray roasting type of ferrite production.

The disposal of used-up dry cells according to the present invention has been explained with reference to FIG. 1 by way of example but not by way of limitation. For instance, the present invention is applicable to any process involving the steps of crushing used-up manganese dry cells, obtaining a mixture predominantly composed of the combined substance by sieving, and calcining the combined substance or the mixture predominantly composed of the combined substance, preferably after water washing.

Here reference will now be made to the grades "PU" and "P" mentioned above. "PU" and "P" are the rating of manganese dry cells according to JIS C8501. PU is superior in duration to P. Manganese dry cells belonging to the grades "P" and "PU" are comparable to P (high-power) in the rating according to IEC 86- 2.

For the purpose of comparison in terms of cell type, IEC Standards and the Japanese Industrial Standards (JIS) are set out below.

| IEC Standards | JIS |
|---|---|
| R6P | R6P, R6PU |
| R14P | R14P, R14PU |
| R20P | R20P, R20PU |

According to JIS "P" and "PU" are discriminated upon the following criterion.

The average cell duration that provides this criterion must exceed the characteristic value of cell duration shown in Table 1 (hereinafter simply called the characteristic value), when testing is performed under the following conditions to find the average cell duration in the following procedure.

In connection with this testing, note that any visually observable leakage should be avoidable.

Cell duration is tested under the following conditions.

1) Discharge should start after the cell sample has been allowed to stand at the temperature and humidity shown in Table 1 for at least 8 hours.
2) For discharge temperature and humidity, see Table 1.
3) For resistance, see Table 1.
4) For how to discharge, see Table 1. However, discharge should take place for five or more days within one week. When discharge occurs twice a day, the interval should be at least 4 hours.
5) Discharge should finish when the closed-circuit voltage initially falls below the finish voltage shown in Table 1.

The average cell duration is tested and estimated in the following procedure.

1) Nine (9) cell samples are tested.
2) The average value of all measurements is found.
3) The cell samples are taken as conforming to the characteristic value, when the found average value is equal to or less than the characteristic value shown in Table 1 and less than one cell sample has a found value below 60% of the characteristic value shown in Table 1.
4) The cell samples are not taken as non-conforming to the characteristic value shown in Table 1, even when the found average value is less than the characteristic value and more than two cells have a found value below 60% of the characteristic value. That is, nine other cell samples are again tested in the second run to find the average value as in the first run.
5) In the second run the cell samples are taken as conforming to the characteristic value shown in Table 1, when the average value exceeds the characteristic value and less than one cell sample has a found value less than 60% of the characteristic value.
6) In the second run the cell samples are taken as non-conforming to the characteristic value shown in Table 1, when the average value is below the characteristic value and more than two cell samples have a found value below 60% of those characteristic values. That is, these cell samples are not subject to the third testing run.

TABLE 1

| | Duration | | | | |
|---|---|---|---|---|---|
| | Discharge Conditions | | | | Characteristics Average Duration |
| Type | Temperature and Humidity | Resistance (Ω) | Daily Period | End Pint (V) | (Within the recommendable term of use) |
| R6P | 20 + 2° C. (65 ± 20)% | 5 | 15 min. × twice | 0.9 | 100 min. |
| | | 10 | 1 hour | 1.0 | 2.8 hrs. |
| | | 75 | 4 hrs. | 0.9 | 39 hrs. |
| R6PU | | 5 | 15 min. × twice | | 115 min. |
| | | 10 | 1 hour | 1.0 | 3.7 hrs. |
| | | 75 | 4 hrs. | 0.9 | 49 hrs. |
| R14P | | 2 | 15 min. × twice | | 77 min. |
| | | 10 | 2 hrs. | 1.0 | 9.0 hrs. |
| | | 40 | 4 hrs. | 0.9 | 61 hrs. |
| R14PU | | 2 | 15 min. × twice | | 115 min. |
| | | 10 | 2 hrs. | 1.0 | 15 hrs. |
| | | 40 | 4 hrs. | 0.9 | 85 hrs. |
| R20P | | 2 | 30 min. × twice | | 235 min. |
| | | 10 | 4 hrs. | 1.0 | 24 hrs. |
| | | 20 | | 0.9 | 69 hrs. |
| R20PU | | 2 | 30 min. × twice | 0.9 | 350 min. |
| | | 10 | 4 hrs. | 1.0 | 37 hrs. |
| | | 20 | | 0.9 | 95 hrs. |

TABLE 1-continued

| | Discharge Conditions | | | Characteristics Average Duration |
|---|---|---|---|---|
| Type | Temperature and Humidity | Resistance (Ω) | Daily Period | End Pint (V) | (Within the recommendable term of use) |

Remarks
Within the recommendable term of use the average value of duration should conform to the above characteristic value, and the characteristic values based on the above three types of testing conditions as well.

On the other hand, the reference values for the grades R6P, R14P and R20P according to IEC 86-2 are those of the initial duration, each being the average value on randomly sampled nine cells. Also the reference values after the lapse of 12 months are defined as 80% of the initial values.

According to the IEC Standards cells are rated by both heavy- and light-load discharge tests. For "P", see Table 2. In this case, the cells are tested and estimated according to the Japanese Industrial Standards (JIS).

TABLE 2

| | Discharge Conditions | | | |
|---|---|---|---|---|
| Grade | Resistance | Daily Period | End Point | Minimum Average Duration (Initial) |
| R20P* | 3.9 Ω | 1 hour | 1.0 V | 12 hrs. or more |
| | 39 Ω | 4 hrs. | 0.9 V | 164 hrs. |
| R14P* | 6.8 Ω | 1 hour | 1.0 V | 8 hrs. or more |
| | 75 Ω | 4 hrs. | 0.9 V | 148 hrs. |
| R6P* | 10 Ω | 1 hour | 0.9 V | 4 hrs. or more |
| | 300 Ω | 12 hrs. | 0.9 V | 216 hrs. |

*High-Power

Remarks

The tests were done at a temperature of 20°±2° C. and a humidity of (60±15)%.

For the purpose of comparison, the classifications of cell forms according to JIS and ANSI C18.1 are tabulated below.

| JIS | ANSI Standards |
|---|---|
| R20P | 13C |
| R20PU | 13CD |
| R14P | 14C |
| R14PU | 14CD |
| R6P | 6C |
| R6PU | 6CD |

According to the present invention, the metals recovered from used-up dry cells as mentioned above are used for ferrite production. One example of a dry type of Mn-Zn ferrite production will now be explained.

A calcined and pulverized product obtained from the black type of used-up manganese dry cells is mixed with commercially available ferric oxide at a given proportion. If required, commercially available trimanganese tetraoxide and zinc oxide are then added to the mixture for component control.

Mixing may be carried out with the use of a dry mixer and optionally with the addition of a suitable solvent such as water. The obtained mixture is dried by means of a spray dryer, and then calcined at a temperature of 700° to 1,100° C. for about 1 to 4 hours in an air atmosphere.

The thus calcined product is pulverized to a given particle diameter (of 1.0 to 3.0 μm on the average) by means of a crusher or fine grinding mill, followed by drying with a spray dryer, etc., granulation, and forming.

The formed body of given shape is then fired or sintered. Sintering may be carried out by use of an electric furnace, etc., and conventional sintering temperature, time and atmosphere may be used for this purpose.

To improve the magnetic properties of ferrite, use may be made of minor amounts of additives in addition to impurities present in the oxides mentioned above.

Usually, the sintering atmosphere may be air or its mixture of nitrogen and sintering may occur at 1,150° to 1,400° C. for about 1 to 5 hours.

In this way the end Mn-Zn ferrite is obtained.

Other ferrites such as those mentioned above, too, may be likewise obtained.

Such ferrites are soft magnetic materials that are suitable for use in the form of transformers for communications and radio, magnetic recording heads, polarizing yokes for CRTs, electromagnetic noise filters, radio wave absorbers, etc.

Moreover, the present invention is applicable to the production of magnetic powders such as ferrite carrier particles. In this case, the above metal oxides obtained from used-up dry cells may be used as raw materials according to conventional production processes.

One example of a spray roasting type of Mn-Zn ferrite production will then be explained.

The calcined and pulverized product and metallic iron obtained from the black type of used-up dry cells and optionally the zinc (Zn) compound and zinc metal obtained by effluent disposal are used to prepare a solution of their chlorides. More specifically, the above metal components are dissolved in an about 18% hydrochloric acid. The chloride solution may be refined according to the need. This refinement may be carried out as by filtration, whereby insoluble and suspended matters can be removed. The insoluble and suspended matters are mainly carbon, or the like. Following this and according to the need, the chloride solution is regulated to optimum pH by the addition of a pH regulator unharmful to ferrite, after which a flocculant is added to the chloride solution to form insolubles of silicon (Si). The insolubles are then removed as by filtration. According to the need, some phosphorus (P) components harmful to ferrite may be removed from the chloride solution by adding a flocculant thereto, thereby forming insolubles of P and removing the insolubles as by filtration. By use of such refining operations it is possible to obtain a ferrite of very high purity, even when the refinement of used-up dry cells at the disposal process has been insufficient.

To control the components quantitatively, iron, manganese or zinc compounds may further be added to the above refined solution, although depending on the desired ferrite composition. A sole limitation, if any, on these additive compounds is that they must be soluble in hydrochloric acid; they may usually be in the form of chlorides, oxides, and so The above solution is then simultaneously roasted in a spray roasting furnace at a temperature of 450° to 850° C., thereby obtaining metal oxides.

The particulate metal oxides obtained by spray roasting have an average particle diameter of the order of 0.1 to 3.0 μm. If required, they may further be disintegrated or, in some cases, pulverized.

The iron, manganese and zinc-containing metal oxide particles obtained by spray roasting are then slurried through the required pulverization step. To obtain the desired ferrite composition, zinc oxide or other additives may be added to the slurry. For zinc oxide use may then be made of commercially available one.

In the present invention it is preferable to obtain roasted particles by using manganese, zinc and iron components derived from used-up cry cells, as already mentioned. However, the invention is not limited to such an embodiment. For instance, the metal components coming from used-up dry cells may bemused as any one of the above components or a part of one component.

The slurry containing the metal oxide particles at a predetermined proportion is then calcined. This calcination, for instance, may occur at a temperature of 700° to 1,100° C. for about 1 to 4 hours in an air atmosphere. The thus calcined product is then pulverized to a given particle diameter (of 1.0 to 3.0 μm on the average). This pulverization may be carried out with a crusher or fine grinding mill. The pulverized product is then dried by means of a spray dryer, granulated, and formed.

The formed body of given shape is then fired or sintered. This sintering may be carried out with the use of an electric or other furnace under conventional sintering conditions of atmosphere, temperature and time. To improve the magnetic properties of ferrite, minute amounts of additives may be used in addition to impurities present in the oxides mentioned above. These minute amounts of additives may have been added to the chloride solution mentioned above.

Usually, the sintering atmosphere may be air or its mixture with nitrogen; the sintering temperature 1,150° to 1,400° C.; and the sintering time about 1 to 5 hours.

In this way the Mn-Zn ferrite is obtained.

Other ferrites such as those already mentioned may likewise be obtainable.

Such ferrites provide soft magnetic materials that are suitable for use in the form of source transformers, transformers for communications and radio, etc.

The ferrites obtained according to the present invention are all on a practical-enough level in view of magnetic properties.

EXAMPLES

The present invention will now be explained at great length with reference to the following examples.

EXAMPLE 1

Through a suitable combination of shape, weight, color and bar code sorting techniques 1 ton of used-up dry cells was sorted into 325 kg of the black type and 310 kg of the red type.

Then, the black type was treated as follows.

Using a screened swing hammer crusher, 325 kg of the black type were crushed and sieved. The screen used was a vibrating screen provided with a sieve having an opening of 2 mm. Crushing was done at such a peripheral speed that the combined substance was reduced to 2 mm or less in size. Crushing and sieving were repeated twice for an oversize product exceeding 2 mm. In this way, 196 kg (137 liters in volume) of the final powdery product composed predominantly of the combined substance of up to 2 mm in size were obtained.

Then, this powdery product was washed with water, and filtered. Ion exchanged water was used as the washing water in the total amount of 784 liters.

The solid matter obtained by filtration was dried by a dryer, and then calcined at a temperature of about 800° C. for about 4.5 hours in a rotary kiln in which an oxidizing atmosphere prevailed.

The calcined product was then pulverized with the use of a pulverizer provided with a screen having an opening of 0.3 mm, thereby obtaining 97 kg (49.5 liters in volume) of the calcined and pulverized product which was found to be composed of 63.7% by weight of MnO, 26.9% by weight of ZnO, 0.04% by weight of Cl, 0.02% by weight of C, 0.032% by weight of $SiO_2$, 0.02% by weight of CaO, 0.02% by weight of MgO, 0.004% by weight of P, 0.023% by weight of $Na_2O$, and 0.013% by weight of $K_2O$.

To obtain a predetermined ferrite composition, 213 kg of commercially available ferric oxide, commercially available trimanganese tetraoxide and zinc oxide were added to 88 kg of the thus obtained calcined and pulverized product for component control. It is noted that the raw powders were about 3 μm in size. The raw powders were mixed together by a wet mixer, and the mixture was then granulated by a pan granulator, followed by a 2-hour calcination at 950° C. The obtained calcined powders were further pulverized to an average particle diameter of 1.5 μm by means of a crusher and a fine grinding mill, granulated by a spray dryer, and formed into toroidal shape by means of an automatic powder-forming machine to obtain a formed body.

This formed body was sintered in an electric furnace at 1,350° C. for 3 hours in a mixed atmosphere of air and nitrogen (with an oxygen partial pressure of 0.1 to 5%, 1 atm.). In this way, an annular magnetic core made up of Mn-Zn ferrite was obtained, which was 51 mm in outer diameter, 31 mm inner diameter and 13 mm in thickness.

The thus obtained ferrite magnetic core was found to be composed of 53 mol % of $Fe_2O_3$, 35.5 mol % of MnO and 11.5 mol % of ZnO.

By measurement of magnetic properties, the obtained ferrite magnetic core was found to have a saturation flux density of 4.9 mT, a permeability of 2,000 and a core loss of 500 $kW/m^3$; this was confirmed to be a practical-enough magnetic core for source transformers, and so on.

EXAMPLE 2

The filtrate obtained at the water washing step in Example 1 was recovered along with washings for off-gases emitted from the calcination step. These liquids were concentrated for recovery of zinc chloride. It is noted that the zinc in the undersize product was contained in an amount of 4.6% by weight in the filtrate and in an amount of 3.2% by weight in the washings, both relative to the total zinc content of the dry cells.

In another experiment run, a pulverized product was obtained following the procedure mentioned above except the water washing step. This pulverized product was found to be larger than that obtained through the water washing step in the amount of impurities.

Calcination was carried out as in Example 1, but at a temperature of about 800° C. for a period of about 4.5 hours in a reducing atmosphere, thereby obtaining 96 kg (53 liters in volume) of a pulverized product, which was found to be composed of 61.0% by weight of MnO, 29.1% by weight of ZnO, 0.20% by weight of Cl, 2.9% by weight of C, 0.016% by weight of $SiO_2$, 0.054% by weight of CaO, 0.026% by weight of MgO, 0.007% by weight of P, 0.022% by weight of $Na_2O$, and 0.026% by weight of $K_2O$.

In still another experiment run, a pulverized product was obtained following the procedure of Example 1 except the water washing step. This product was found to be larger than that washed with water in the amount of impurities. More exactly, the product obtained according to the present invention was found to be reduced by 67% by weight for $Na_2O$, 73% by weight for $K_2O$, 58% by weight for MgO, 68% by weight for CaO, and 58% by weight for the chlorine content (calculated as Cl). This shows that the water washing step according to the present invention is effective for reducing the amount of impurities, and teaches that, whether in the reducing atmosphere or in the oxidizing atmosphere, the water washing step is effective for reducing the amount of impurities.

One hundred and twenty-nine (129) kg of the oversize product (of 258 liters in volume) obtained by the above sieving were subjected to air elutriation at an air velocity of 12 to 17 m/sec. Consequently, 14 kg of the elutriated product (of 70 liters in volume) were obtained. This product was comprised mainly of paper and plastics, and so incinerated for disposal. Iron sheaths were magnetically separated from the oversize product by means of a drum type of magnetic separator or a magnet roller. It is here understood that the oversize product was subjected to repeated magnetic separation at the pulverization and sieving steps that were repeatedly carried out.

In this way, 36 kg of scrap iron (of 60 liters in volume) were finally obtained. This iron was of 98% purity. Non-magnetic matter obtained at the magnetic separation step was crushed by means of a crusher, and sieved by a sieve having an opening of 5 mm, so that carbon rods could be crushed to an undersize particle diameter for separation from zinc containers. The amount of the thus obtained carbon powders was 11 kg.

The oversize product obtained by crushing and sieving and composed mainly of zinc containers, on the other hand, was washed with water, dried, and sieved. Following this, the product was melted by heating at 500° C. to obtain 31 kg of zinc metal of 98.8% purity.

Apart from the black type, the red type was treated as mentioned above. However, the solid matter derived from the combined substance and obtained through filtration was calcined at 800° C. for 1.5 hours in a reducing atmosphere. In this case, 87 kg (48 liters in volume) of a pulverized product of an Mn-Zn compound having the following composition were obtained.

MnO: 53.2% by weight
ZnO: 32.1% by weight
Cl: 0.33% by weight
C: 4.51% by weight
$SiO_2$: 0.32% by weight
CaO: 0.11% by weight
MgO: 0.074% by weight
P: 0.036% by weight
$Na_2O$: 0.060% by weight
$K_2O$: 0.20% by weight In another experiment run, a pulverized product was obtained following the procedure of Example 1 except the water washing step. This product was found to be larger than that washed with water in the amount of impurities. Here, too, it was found that the water washing step according to the present invention is advantageous to reduce the amount of impurities.

Calcination was carried out as in Example 1, but for 4.5 hours in an oxidizing atmosphere, thereby obtaining 88 kg (44 liters in volume) of a pulverized product, which was found to be composed of 52.4% by weight of MnO, 30.7% by weight of ZnO, 0.08% by weight of Cl, 0.01% by weight of C, 0.84% by weight of $SiO_2$, 0.065% by weight of CaO, 0.033% by weight of MgO, 0.019% by weight of P, 0.03% by weight of $Na_2O$, and 0.094% by weight of $K_2O$.

In still another experiment run, a pulverized product was obtained following the procedure mentioned above except the water washing step. This pulverized product was found to be larger than that obtained through the water washing step in the amount of impurities.

Scrap iron of 98% purity was obtained in an yield of 40 kg (67 liters in volume). Also 11 kg of carbon were obtained along with 23 kg of zinc of 98.2% purity.

EXAMPLE 3

To obtain a predetermined ferrite composition, 287 kg of commercially available ferric oxide, commercially available trimanganese tetraoxide and zinc oxide were added to 81 kg of the calcined and pulverized product obtained as in Example 1 for component control. It is noted that the raw powders were about 1.5 μm in size.

Then, water was mixed with the thus formulated composition at a proportion of 1:1 on part-by-weight basis by means of a ball mill for 5 hours to prepare a slurry, to which suitable amounts of dispersant and binder were added.

The mixture was then granulated and dried by a spray dryer at a temperature of 150° C. or higher. The thus granulated product was subjected to fluidized bed firing at a temperature of 1,300° C. for 3 hours in a given atmosphere.

The thus fired product was thereafter disintegrated and classified to obtain ferrite particles having an average mean diameter of 1.0 μm.

These ferrite particles were found to be composed of 53.8 mol % of $Fe_2O_3$, 38.2 mol % of MnO, and 8.0 mol % of ZnO.

By measurement, the obtained ferrite particles were found to have a saturation magnetization sm of 80 emu/g and a resistance R of $10^8 \Omega$ at an applied voltage of 100 V; that is, they were found to be usable as practical-enough magnetic carrier particles.

The above ferrite particles were immediately used as magnetic carrier particles for mixing with a commercially available two-component toner (having an average particle diameter of 11.5±1.5 μm) at a toner concentration of 11.5% by weight, thereby making a developer.

This developer was used on a commercially available electrostatic copying machine for magnetic brush development.

The thus obtained image had a sufficient density with no substantial deposition of the carrier onto the photosensitive material and a much reduced scattering of the carriers.

EXAMPLE 4

A calcined and pulverized product was obtained as in Example 1. However, calcination was done at a temperature of about 800° C. for about 1.5 hours in a reducing atmosphere.

The composition of this pulverized product was the same as that of Example 1 with the exception that the content of C was 4.1% by weight.

Added to the process of Example 1 were the following steps.

The filtrate obtained at the water washing step was recovered along with washings for off-gases emitted from the calcination step. These liquids were concentrated for recovery of zinc chloride. It is noted that the zinc in the undersize product was contained in an amount of about 4.6% by weight in the filtrate and in an amount of about 3.2% by weight in the washings, both relative to the total zinc content of the dry cells.

One hundred and twenty-nine (129) kg of the oversize product (of 258 liters in volume) obtained by sieving in Example 1 were subjected to air elutriation at an air velocity of 12 to 17 m/sec. Consequently, the elutriated product was obtained in an amount of 14 kg (70 liters in volume). This product was mainly comprised of paper and plastics, and so incinerated for disposal. Iron sheaths were magnetically separated from the oversize product by means of a drum type of magnetic separator or a magnet roller. It is here understood that the oversize product was subjected to repeated magnetic separation at the pulverization and sieving steps that were repeatedly carried out.

In this way, scrap iron (of 60 liters in volume) was finally obtained in an yield of 36 kg. This iron was of 98% purity.

Non-magnetic matter obtained at the magnetic separation step was crushed by means of a crusher, and sieved by a sieve having an opening of 5 mm, so that carbon rods could be crushed to an undersize particle diameter for separation from a product composed mainly of zinc containers. The oversize product composed mainly of zinc containers, obtained by crushing and sieving, were washed with water, dried, and sieved. Following this, the thus sieved product was melted by heating at 500° C. to obtain 31 kg of zinc metal of 98.8% purity.

One hundred and seventy-five (175) kg of the calcined and pulverized product obtained as mentioned above were dissolved in a 18% hydrochloric acid to obtain a chloride solution. On the other hand, 552 kg of metallic iron obtained in similar manners as mentioned above were dissolved in hydrochloric acid to obtain a similar chloride solution. These were once filtered for insoluble removal. A flocculant was added to the filtrates to form insolubles of P, which were then filtered off.

After this, a pH regulator was added to the filtrate to obtain optimum pH, and a flocculant was then added to the filtrate to form insolubles of Si, which were in turn filtered off to obtain a filtrate. These solutions obtained through the respective steps were mixed together at a ratio corresponding to the desired ferrite composition.

In this case, chloride solutions of zinc chloride and zinc metal obtained from the disposal steps mentioned above were used as the constitutional ingredients of composition.

The thus obtained liquid feed was subjected to spray roasting at a roasting temperature of 500° C. in a spray roasting furnace to obtain metal oxide particles (powders) having an average particle diameter of 1.0 to 2.0 μm.

It is here noted that the required amounts of the calcined and pulverized product, metallic iron, or the like were suitably obtained by repeating the disposal steps mentioned above.

Thereafter, the raw powdery mixture containing the oxides at a given proportion was mixed together, followed by a 2-hour calcination at 950° C. The obtained calcined powders were further pulverized to an average particle diameter of 1.5 μm by means of a crusher and a fine grinding mill, granulated by a spray dryer, and formed into toroidal shape by means of an automatic powder-forming machine to obtain a formed body.

This formed body was sintered in an electric furnace at 1,350° C. for 3 hours in a mixed atmosphere of air and nitrogen (with an oxygen partial pressure of 0.1 to 5%, 1 atm.). In this way, an annular magnetic core made up of Mn-Zn ferrite was obtained, which was 51 mm in outer diameter, 31 mm inner diameter and 13 mm in thickness.

The thus obtained ferrite magnetic core was found to be composed of 53 mol % of $Fe_2O_3$, 35.5 mol % of MnO, and 11.5 mol % of ZnO.

By measurement of magnetic properties, the obtained ferrite magnetic core was found to have a saturation flux density of 4.9 mT, a permeability of 2,200 and a core loss of 400 $kW/m^3$; this was confirmed to be a practical-enough magnetic core for source transformers, and so on.

EFFECT

According to the present invention, it is possible to obtain ferrites on a practical-enough level by making use of used-up dry cells, thereby achieving a saving of resources and preservation of the environment.

What is claimed is:

1. A process for recycling used-up dry cells by sorting manganese dry cells out of said used-up dry cells, crushing the thus sorted manganese dry cells, sieving the thus crushed manganese dry cells to obtain a mixture that is composed predominantly of anodic substances, washing said mixture with water, and calcining the thus washed mixture at a temperature of 700° to 950° C. for about 1 to 5 hours to obtain manganese and zinc oxides.

2. A process for recycling used-up dry cells according to claim 1, wherein said sieving is carried out with a sieve having an opening of 1 to 4 mm.

3. A process for recycling used-up dry cells according to claim 1, wherein said water washing is carried out with water that, on weight basis, is 2 to 10 times as much as the material to be washed.

4. A process for recycling used-up dry cells according to claim 1, wherein said manganese dry cells sorted out of said used-up dry cells are further sorted out according to ultra-high-power and high-power grades, and then crushed for each grade.

5. A process for recycling used-up dry cells according to claim 1, wherein an oversize mixture that is predominantly made up of metal sheaths, cathodic substances and collecting rods of a size exceeding about 2 mm is obtained by said sieving, and said oversize mixture is then magnetically sorted into iron, lead and carbon components.

6. A process for preparing ferrite, comprising sorting manganese dry cells out of used-up dry cells, crushing the thus sorted manganese dry cells, sieving the thus crushed manganese dry cells to obtain a mixture that is composed predominantly of anodic substances, washing said mixture with water, calcining the thus washed mixture at a temperature of 700° to 950° C. for about 1 to 5 hours to obtain manganese and zinc oxides, and reacting said manganese and zinc oxides with an iron component to obtain said ferrite.

7. A process for preparing ferrite according to claim 6, wherein said water washing is carried out with ion exchanged water, whereby at least one impurity of sodium or potassium compounds, calcium oxide, magnesium oxide and chlorine compounds is removed.

8. A process for preparing ferrite according to claim 6, wherein a raw powdery mixture comprising said manganese and zinc oxides and said iron component is fired to obtain said ferrite.

9. A process for preparing ferrite according to claim 8, wherein said calcination is carried out in an oxidizing atmosphere for carbon removal.

10. A process for preparing ferrite according to claim 6, wherein said manganese and zinc oxides are used as the raw material to obtain a chloride solution, the thus obtained chloride solution is roasted in a spray roasting furnace to obtain metal oxide particles, the thus obtained metal oxide particles are used to obtain a raw powdery mixture, and the thus obtained raw powdery mixture is fired together with said iron component.

11. A process for preparing ferrite according to claim 10, wherein an oversize mixture that is predominantly made up of metal sheaths, cathodic substances and collecting rods of a size exceeding about 2 mm is obtained by said sieving, followed by magnetic sorting for obtaining an iron component, and the thus obtained iron component is used as the raw material to obtain said chloride solution.

12. A process for preparing ferrite according to claim 10, wherein an oversize mixture that is predominantly made up of metal sheaths, cathodic substances and collecting rods of a size exceeding about 2 mm is obtained by said sieving, followed by magnetic sorting for obtaining an zinc component, and the thus obtained zinc component is used as the raw material to obtain said chloride solution.

13. A process for preparing ferrite according to claim 10, comprising separating and removing any silicon component present in said chloride solution and wherein said roasting is carried out in a spray roasting furnace.

14. A process for preparing ferrite according to claim 10, comprising separating and removing any carbon component present in said chloride solution and wherein said roasting is carried out in a spray roasting furnace.

\* \* \* \* \*